United States Patent
Song

(10) Patent No.: US 11,243,718 B2
(45) Date of Patent: Feb. 8, 2022

(54) DATA STORAGE APPARATUS AND OPERATION METHOD THEREOF

(71) Applicant: SK hynix Inc., Icheon (KR)

(72) Inventor: Da Eun Song, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/905,423

(22) Filed: Jun. 18, 2020

(65) Prior Publication Data

US 2021/0191655 A1 Jun. 24, 2021

(30) Foreign Application Priority Data

Dec. 20, 2019 (KR) .................. 10-2019-0171623

(51) Int. Cl.
*G06F 12/00* (2006.01)
*G06F 13/00* (2006.01)
*G06F 3/06* (2006.01)
*G06F 9/30* (2018.01)

(52) U.S. Cl.
CPC .......... *G06F 3/0659* (2013.01); *G06F 3/0611* (2013.01); *G06F 3/0631* (2013.01); *G06F 3/0644* (2013.01); *G06F 3/0683* (2013.01); *G06F 9/30047* (2013.01)

(58) Field of Classification Search
CPC .... G06F 3/0659; G06F 3/0611; G06F 3/0631; G06F 3/0644; G06F 3/0683; G06F 9/30047
USPC ......................................... 711/154
See application file for complete search history.

(56) References Cited

U.S. PATENT DOCUMENTS

| 6,324,632 | B1* | 11/2001 | McIntosh-Smith ........................ G06F 12/0848 711/173 |
| 9,081,501 | B2* | 7/2015 | Asaad ................ G06F 12/0862 |
| 10,102,149 | B1* | 10/2018 | Appu ........................ G06T 1/60 |
| 10,564,972 | B1* | 2/2020 | Doshi ................ G06F 12/0868 |
| 10,657,064 | B1* | 5/2020 | Khan ................. G06F 12/0893 |
| 10,678,692 | B2* | 6/2020 | Pugsley .............. G06F 9/30047 |
| 10,678,697 | B1* | 6/2020 | Iyer ....................... G06F 3/0617 |
| 10,831,659 | B2* | 11/2020 | Purushotham ...... G06F 12/0895 |
| 2004/0034747 | A1* | 2/2004 | Rowlands ........... G06F 12/0824 711/148 |
| 2005/0251631 | A1* | 11/2005 | Rowlands ............. G06F 12/084 711/145 |
| 2006/0106991 | A1* | 5/2006 | Franaszek ........... G06F 12/0897 711/137 |
| 2006/0179234 | A1* | 8/2006 | Bell, Jr. ................ G06F 12/126 711/136 |

(Continued)

FOREIGN PATENT DOCUMENTS

KR 101891428 B1 9/2018

*Primary Examiner* — Sheng Jen Tsai

(57) ABSTRACT

A data storage apparatus may include a first memory device comprising a first area in which write data from a host device are stored and a second area, a second memory device into which the write data stored in the first memory device are copied, a storage device, and a controller. The controller is configured to control data input/output for the first memory device, the second memory device and the storage device, wherein the controller comprises a cache manager configured to evict eviction target data from the second memory device by: storing the eviction target data into the storage device, and storing the eviction target data into the second area of the first memory device.

16 Claims, 8 Drawing Sheets

(56) References Cited

U.S. PATENT DOCUMENTS

| | | | | |
|---|---|---|---|---|
| 2006/0212654 | A1* | 9/2006 | Balakrishnan | G06F 12/0875 711/125 |
| 2007/0043531 | A1* | 2/2007 | Kosche | G06F 11/3471 702/182 |
| 2007/0204121 | A1* | 8/2007 | O'Connor | G06F 12/126 711/163 |
| 2007/0226795 | A1* | 9/2007 | Conti | G06F 21/554 726/22 |
| 2008/0040555 | A1* | 2/2008 | Iyer | G06F 12/0811 711/133 |
| 2008/0059707 | A1* | 3/2008 | Makineni | G06F 12/0897 711/122 |
| 2010/0293420 | A1* | 11/2010 | Kapil | G06F 12/0815 714/710 |
| 2011/0090251 | A1* | 4/2011 | Donovan | G06T 15/503 345/632 |
| 2011/0258415 | A1* | 10/2011 | Chou | G06F 9/384 712/216 |
| 2012/0198164 | A1* | 8/2012 | Damodaran | G06F 1/3296 711/122 |
| 2013/0054897 | A1* | 2/2013 | Flemming | G06F 12/128 711/122 |
| 2013/0166846 | A1* | 6/2013 | Gaur | G06F 12/0897 711/122 |
| 2014/0006716 | A1* | 1/2014 | Steeley, Jr. | G06F 15/167 711/130 |
| 2014/0181404 | A1* | 6/2014 | Chaudhary | G06F 12/0811 711/122 |
| 2015/0127909 | A1* | 5/2015 | Ghai | G06F 11/141 711/122 |
| 2015/0127912 | A1* | 5/2015 | Solihin | G06F 12/0848 711/125 |
| 2015/0199138 | A1* | 7/2015 | Ramachandran | G06F 3/0656 711/103 |
| 2015/0312116 | A1* | 10/2015 | Taheri | H04L 43/00 709/224 |
| 2015/0372910 | A1* | 12/2015 | Janakiraman | H04L 45/74 370/392 |
| 2016/0048451 | A1* | 2/2016 | Solihin | G11C 7/1072 711/105 |
| 2016/0188474 | A1* | 6/2016 | Wang | G06F 9/45558 711/119 |
| 2017/0091090 | A1* | 3/2017 | Wang | G06F 12/126 |
| 2018/0095880 | A1* | 4/2018 | Doshi | G06F 12/128 |
| 2018/0121353 | A1* | 5/2018 | Gaur | G06F 12/0831 |
| 2018/0150124 | A1* | 5/2018 | HomChaudhuri | G06F 9/4418 |
| 2018/0276143 | A1* | 9/2018 | Little | G06F 12/0846 |
| 2018/0336142 | A1* | 11/2018 | Pellegrini | G06F 12/1027 |
| 2019/0042446 | A1* | 2/2019 | Sukhomlinov | G06F 21/556 |
| 2019/0050228 | A1* | 2/2019 | Gopal | G06F 11/1456 |
| 2019/0102303 | A1* | 4/2019 | Wang | G06F 12/0831 |
| 2019/0121748 | A1* | 4/2019 | Moyer | G06F 12/126 |
| 2019/0266086 | A1* | 8/2019 | Mola | G06F 11/3476 |
| 2019/0266090 | A1* | 8/2019 | Mola | G06F 12/0811 |
| 2019/0272239 | A1* | 9/2019 | Hagersten | G06F 12/0891 |
| 2020/0250086 | A1* | 8/2020 | Khan | G06F 16/9024 |
| 2020/0250100 | A1* | 8/2020 | Khan | G06F 12/0891 |
| 2021/0097000 | A1* | 4/2021 | Dutta | G06F 12/0833 |
| 2021/0149819 | A1* | 5/2021 | Kotra | G06F 12/1045 |

\* cited by examiner

DATA STORAGE APPARATUS AND OPERATION METHOD THEREOF

CROSS-REFERENCES TO RELATED APPLICATION

The present application claims priority under 35 U.S.C. § 119(a) to Korean application number 10-2019-0171623, filed on Dec. 20, 2019, in the Korean Intellectual Property Office, which is incorporated herein by reference in its entirety.

BACKGROUND

1. Technical Field

Various embodiments generally relate to a semiconductor integrated apparatus, and more particularly, to a data storage apparatus and an operation method thereof.

2. Related Art

A host device accesses a storage device in order to read data stored in the storage device or to store data in the storage device. The time required for the host device to read data from the storage device may be considered as a relatively long time from the host device's perspective. Therefore, the host device may use a memory for storing some of the data stored in the storage device.

With the increase in operation speed of the host device, there is a demand for research on an operation policy of a memory device which caches and stores data between the host device and the storage device.

SUMMARY

In an embodiment, a data storage apparatus may include: a first memory device comprising a first area in which write data from a host device are stored and a second area; a second memory device into which the write data stored in the first memory device are copied; a storage device; and a controller configured to control data input/output for the first memory device, the second memory device and the storage device, wherein the controller comprises a cache manager configured to evict eviction target data from the second memory device by: storing the eviction target data into the storage device, and storing the eviction target data into the second area of the first memory device.

In an embodiment, a data storage apparatus may include: a first memory device configured to operate at a first speed; a second memory device configured to operate at a second speed lower than the first speed; a storage device; and a controller configured to select eviction target data from the second memory device and evict the eviction target data to the first memory device and the storage device.

In an embodiment, there is provided an operation method of a data storage apparatus which includes a first memory device, a second memory device, a storage device, and a controller, the operation method comprising: storing, by the controller, write data of a host device into the first memory device, and copying the write data into the second memory device; and evicting, by the controller, eviction target data from the second memory device by storing the eviction target data into the storage device and into the first memory device.

DETAILED DESCRIPTION

Hereinafter, a data storage apparatus and an operation method thereof according to the present disclosure will be described below with reference to the accompanying drawings through illustrative embodiments.

Figure 1:
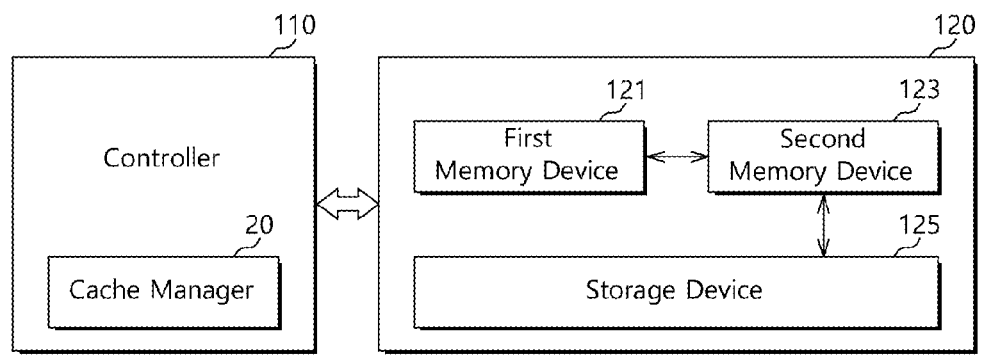
FIG. 1 illustrates a data storage apparatus in accordance with an embodiment.

FIG. 1 is a configuration diagram illustrating a data storage apparatus 10 in accordance with an embodiment.

The data storage apparatus 10 may include a controller 110 and a storage 120.

The controller 110 may control the storage 120 in response to a request of a host device. For example, the controller 110 may program data to the storage 120 according to a write request of the host device. Furthermore, the controller 110 may provide the host device with the data stored in the storage 120 in response to a read request of the host device.

The storage 120 may store data therein or output the stored data under control of the controller 110. The storage 120 may include a volatile memory device, a nonvolatile memory device, or combinations thereof. In an embodiment, the nonvolatile memory device may be a memory device selected among various nonvolatile memory devices such as an EEPROM (Electrically Erasable and Programmable ROM), NAND flash memory, NOR flash memory, PRAM (Phase-Change RAM), ReRAM (Resistive RAM), FRAM (Ferroelectric RAM) and STT-MRAM (Spin Torque Transfer Magnetic RAM). In an embodiment, the volatile memory device may be a memory device selected among various volatile memory devices such as a DRAM (Dynamic Random Access Memory) and SRAM (Static Random Access Memory).

The storage 120 may include a first memory device 121, a second memory device 123 and a storage device 125.

In an embodiment, the first memory device 121 may be a first-level cache memory which is the physically closest to the controller 110 and operates at a first speed. In an embodiment, the first memory device 121 may include a volatile memory device.

The second memory device 123 may be a second-level cache memory which operates at a second speed lower than the first speed. In an embodiment, the second memory device 123 may include a nonvolatile memory device. In an embodiment, the second memory device 123 may further include a volatile memory device. The second memory device 123 may be physically located between the first memory device 121 and the storage device 125.

In an embodiment, the storage device 125 may include a disk apparatus which operates at a third speed lower than the first speed. The third speed may be lower or higher than the second speed.

In an embodiment, the storage device 125 may include a memory device selected among various nonvolatile memory devices such as an EEPROM (Electrically Erasable and Programmable ROM), NAND flash memory, NOR flash memory, PRAM (Phase-Change RAM), ReRAM (Resistive RAM), FRAM (Ferroelectric RAM) and STT-MRAM (Spin Torque Transfer Magnetic RAM).

The storage device 125 may include a plurality of dies Die 0 to Die n, a plurality of chips, a plurality of packages, or combinations thereof. Furthermore, the storage device 125 may operate as a single-level cell for storing one-bit data therein or a multi-level cell for storing multi-bit data therein.

As the data storage apparatus 10 has a hierarchical structure in which the controller 110, the first memory device 121, the second memory device 123, and the storage device 125 are sequentially connected, the controller 110 may manage data stored in the storage 120 using a cache manager 20.

In an embodiment, as input data transferred from the host device with a write request are stored in the first memory device 121, the cache manager 20 may copy the input data into the second memory device 123. Furthermore, the cache manager 20 may load data, evicted from the second memory device 123 to the storage device 125, into the first memory device 121.

In an embodiment, the cache manager 20 may be configured to select eviction target data from the second memory device 123, and evict the selected data to the first memory device 121 and the storage device 125.

In an embodiment, the first memory device 121 may be divided into a first area to which input data of the host device are written and a second area to which data evicted from the second memory device 123 are written.

The capacities of the first area and second areas may be managed by the cache manager 20.

The cache manager 20 may allocate the capacities of the first and second areas according to preset initial values. As the data evicted from the second memory device 123 are stored in the second area, the residual capacity C2_R of the second area (corresponding to a portion of the second area capable of holding valid data but not currently being used to hold valid data) may decrease to less than a first threshold value TH1. In this case, the cache manager 20 may check whether the residual capacity C1_R of the first area (corresponding to a portion of the first area capable of holding valid data but not currently being used to hold valid data) is equal to or more than a second threshold value TH2, in order to incorporate at least a part of the residual space of the first area into the second area.

When the residual capacity C1_R of the first area is equal to or more than the second threshold value TH2, the cache manager 20 may increase the capacity of the second area by incorporating at least a part of the residual space of the first area into the second area. At this time, the cache manager 20 may determine the second threshold value TH2 and the replacement capacity in order to secure the minimum capacity requirement of the first area (for example, 20 to 30% of the entire capacity).

In the present embodiment, when an eviction operation causes eviction target data stored in the first memory device 121 and subsequently copied into the second memory device 123 to be copied into the storage device 125, the eviction target data may also be loaded into the first memory device 121, which may raise the cache hit probability of the eviction target data. Thus, the frequency at which the storage device 125 which operates at a low speed is accessed can be reduced to improve the operation speed of the data storage apparatus 10.

Figure 2:
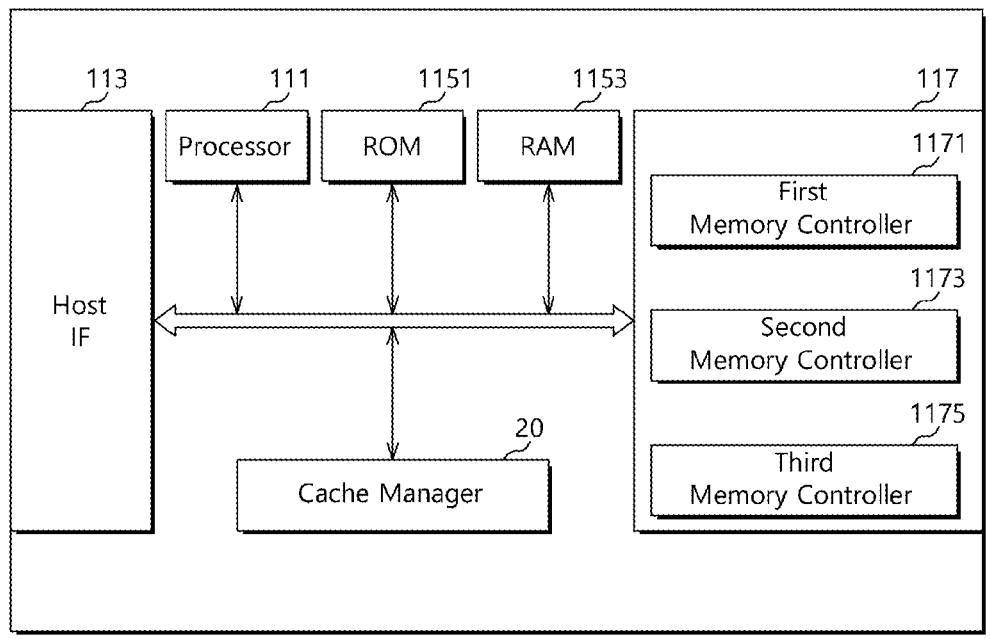
FIG. 2 illustrates a controller in accordance with an embodiment.

FIG. 2 is a configuration diagram illustrating the controller 110 in accordance with the present embodiment.

The controller 110 may include a processor 111, a host interface 113, a ROM 1151, a RAM 1153, a memory controller 117 and the cache manager 20.

The processor 111 may be configured to transfer various pieces of control information to the host interface 113, the RAM 1153 and the memory controller 117, the various pieces of control information being required for a data read or write operation on the storage 120. In an embodiment, the processor 111 may operate according to firmware provided for various operations of the data storage apparatus 10. In an embodiment, the processor 111 may perform a function of an FTL (Flash Translation Layer) for performing garbage collection, address mapping or wear leveling to manage the storage 120 and a function of detecting and correcting an error of data read from the storage 120.

The host interface 113 may provide a communication channel for receiving a command and clock signal from the host device and may control data input/output under the control of the processor 111. In particular, the host interface 113 may provide a physical connection between the host device and the data storage apparatus 10. Furthermore, the host interface 113 may provide an interface with the data storage apparatus 10 according to a bus format of the host device. For example, the bus format of the host device may include one or more of standard interface protocols such as SD (Secure Digital), USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express), and UFS (Universal Flash Storage).

The ROM 1151 may store program codes required for an operation of the controller 110, for example, firmware or software, and store code data used by the program codes.

The RAM 1153 may store data required for the operation of the controller 110 or data generated by the controller 110.

The processor 111 may control a booting operation of the data storage apparatus 10 by loading a boot code stored in the storage 120 or the ROM 1151 into the RAM 1153 during the booting operation.

The memory controller 117 may include first to third memory controllers 1171, 1173, and 1175 configured to control the first memory device 121, the second memory device 123, and the storage device 125, respectively, and provide a communication channel for transmitting/receiving signals between the controller 110 and the storage 120. The memory controller 117 may write input data of the host device to the storage 120 under control of the processor 111. Furthermore, the memory controller 117 may provide the host device with data read from the storage 120.

The cache manager 20 may store the input data, provided from the host device, in the first memory device 121 and the second memory device 123. The cache manager 20 may select eviction target data among the data stored in the second memory device 123, based on an eviction condition. The cache manager 20 may be configured to evict the eviction target data to the storage device 125 and the first memory device 121. In other words, the cache manager 20 may be configured to reload the data evicted to the storage device 125 into the first memory device 121.

Figure 3:
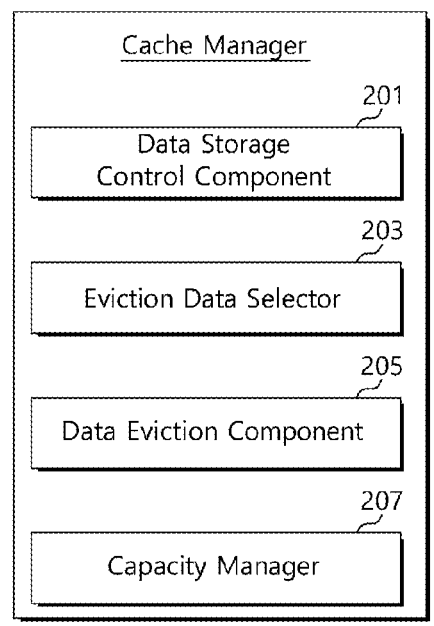
FIG. 3 illustrates a cache manager in accordance with an embodiment.

FIG. 3 is a configuration diagram illustrating the cache manager 20 in accordance with the present embodiment.

The cache manager 20 may be configured to include a data storage control component 201, an eviction data selector 203, a data eviction component 205 and a capacity manager 207. The cache manager and components thereof may be implemented using a digital logic circuit, a processor executing firmware, or combinations thereof.

The data storage control component 201 may be configured to store input data provided from the host device in the first memory device 121, and copy the same input data into the second memory device 123. Therefore, the copy of the data stored in the first memory device 121 may be stored in the second memory device 123.

The eviction data selector 203 may be configured to select data to be evicted from the second memory device 123, based on the eviction condition. The eviction condition may be determined based on a capacity condition of the second memory device 123, a storage time of the data stored in the second memory device 123, an amount of data to be evicted, or combinations thereof.

In an embodiment, when the residual capacity of the second memory device 123 reaches a limit value, the eviction data selector 203 may select, as eviction target data, all or some of the data stored in the second memory device 123. In another embodiment, when the residual capacity of the second memory device 123 reaches the limit value, the eviction data selector 203 may select, as the eviction target data, the oldest data among the data stored in the second memory device 123.

The data eviction component 205 may copy the eviction target data, selected by the eviction data selector 203, into the storage device 125 and the first memory device 121, and remove the eviction target data from the second memory device 123. Therefore, the data removed from the second memory device 123 can be safely stored in the storage device 125, and loaded into the first memory device 121 so as to be read at high speed.

The capacity manager 207 may be configured to manage the residual space of the first memory device 121. In an embodiment, the first memory device 121 may be configured as a first area and a second area.

Figure 4:
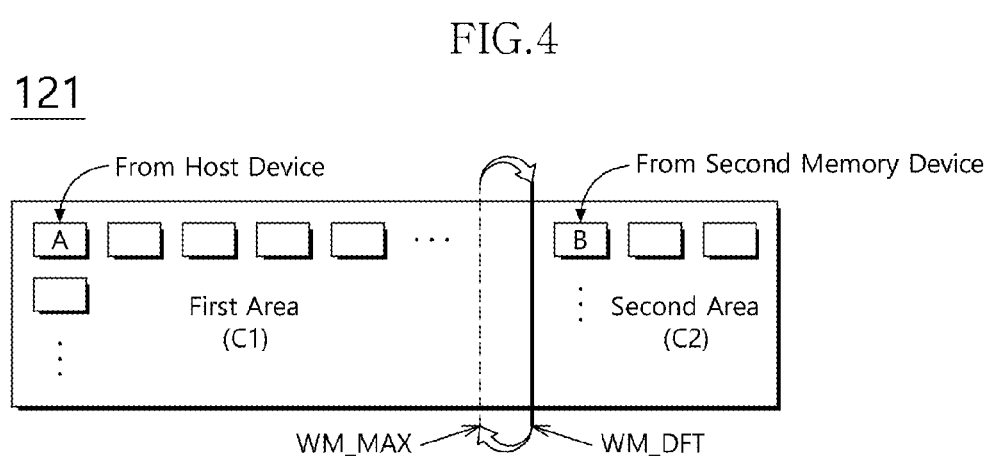
FIG. 4 illustrates a process for managing a first memory device in accordance with an embodiment.

FIG. 4 is a diagram for describing a process for managing the first memory device 121 in accordance with an embodiment. The process may be performed by the capacity manager 207.

The first memory device 121 may include the first area C1 to which input data from the host device are written and the second area C2 to which data evicted from the second memory device 123 are written.

Input data A transmitted from the host device may be stored in the first area C1 and then copied into the second memory device 123.

Data B may be data evicted from the second memory device 123 and stored in the storage device 125 that was also loaded into the first memory device 121.

In case of a read request of the host device, the controller 110 may read data by sequentially accessing the second memory device 123, the first memory device 121, and the storage device 125, for example. When the data to be read are present in the second memory device 123, the controller 110 may receive the corresponding data from the second memory device 123 and provide the received data to the host device.

When the data to be read were evicted and removed from the second memory device 123, the controller 110 may access the second area C2 of the first memory device 121. Since the data evicted from the second memory device 123 are also stored in the first memory device 121, the controller 110 can read data from the second area C2 of the first memory device 121 with a high cache hit probability. When the read target data are not present in the first memory device 121, the controller 110 may read data from the storage device 125.

The capacity manager 207 may divide and allocate the first area C1 and the second area C2 according to a preset initial value WM_DFT.

As the data evicted from the second memory device 123 are stored in the second area C2, the residual capacity C2_R of the second area C2 may decrease to less than the first threshold value TH1. In this case, the capacity manager 207 may check whether the residual capacity C1_R of the first area C1 is equal to or more than the second threshold value TH2, in order to determine whether to incorporate at least a part of the residual space C1_R of the first area C1 into the second area C2.

When the residual capacity C1_R of the first area C1 is equal to or more than the second threshold value TH2, the capacity manager 207 may increase the capacity of the second area C2 by incorporating at least a part of the residual space C1_R of the first area C1 into the second area C2. At this time, the capacity manager 207 can expand the second area C2 to the maximum capacity WM_MAX.

The capacity of the first area C1, which can be incorporated into the second area C2 in order to satisfy the maximum capacity WM_MAX, may be determined at such a level that 20 to 30% of the first area C1 can be secured as the residual capacity of the first area C1.

Accordingly, the eviction target data among the data copied into the second memory device 123 may be stored into the first memory device 121 as well as the storage device 125, which makes it possible to raise the cache hit probability of the eviction target data. As a result, the access frequency of the storage device 125 which operates at a low speed may be reduced to improve the operation speed of the data storage apparatus 10.

Figure 5:
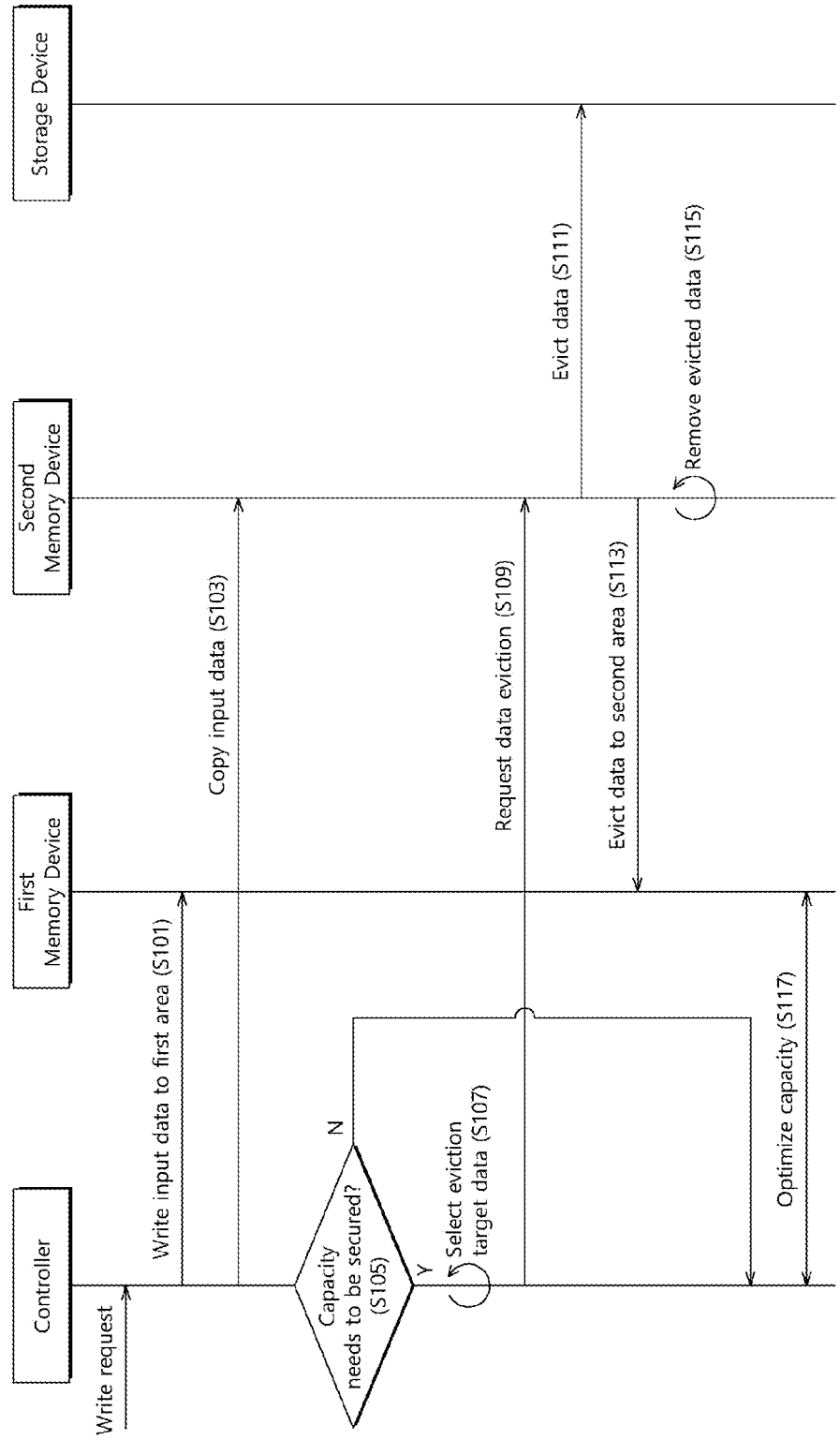
FIGS. 5 and 6 illustrates operations of a data storage apparatus in accordance with an embodiment.
Figure 6:
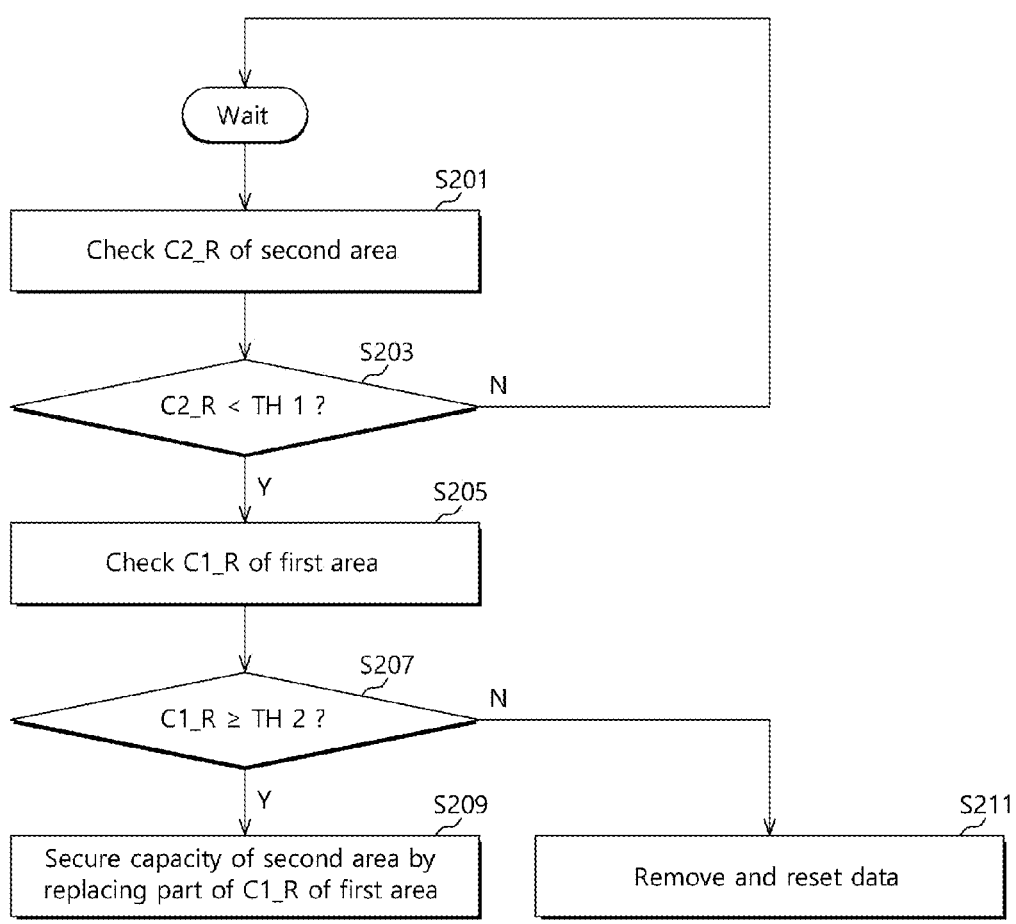
Figure 7:
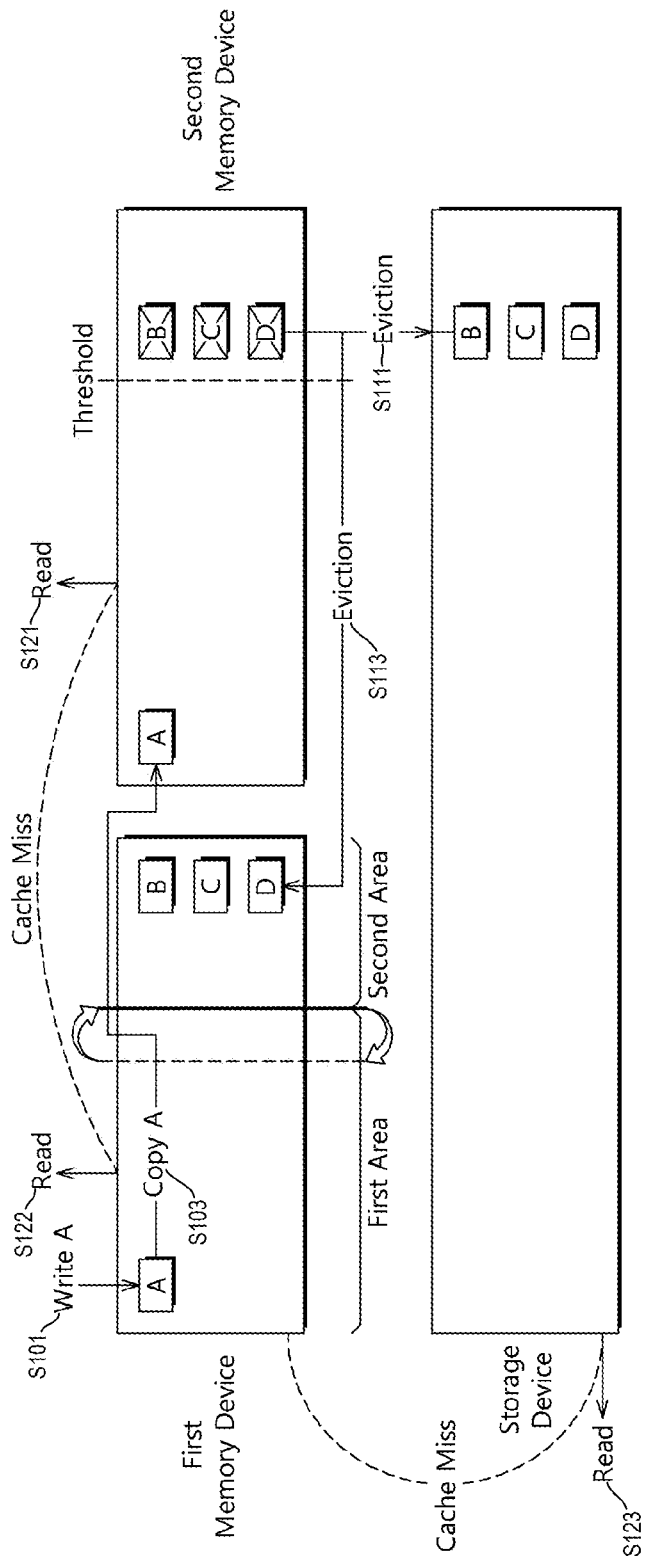
FIG. 7 illustrates operations of the data storage apparatus in accordance with the present embodiment.

FIGS. 5 and 6 are flowcharts for describing an operation of a data storage apparatus in accordance with an embodiment, and FIG. 7 is a conceptual view for describing the operation of the data storage apparatus in accordance with the present embodiment.

Referring to FIGS. 5 and 7, the controller 110 may write input data A to a write zone corresponding to the first area C1 of the first memory device 121 in step S101, and write or copy the input data into the second memory device 123 in step S103, according to a data write command provided from the host device.

Since the capacity of the second memory device 123 is changed as the copy of the input data is stored in the second memory device 123, the controller 110 may check whether the capacity of the second memory device 123 needs to be secured in step S105. In illustrative embodiments, the capacity of the second memory device 123 needs to be secured when, for example, a residual capacity of the second memory device 123 drops below a first capacity threshold, an amount of data in the second memory device 123 that is older than an age threshold exceeds a second capacity threshold, or the like. When the capacity needs to be secured, the controller 110 may select data to be evicted from the second memory device 123, based on the eviction condition, in step S107.

The eviction condition may be determined using the capacity condition of the second memory device 123, the storage time of the data stored in the second memory device 123, the amount of data to be evicted, or combinations thereof.

In an embodiment, when the residual capacity of the second memory device 123 reaches the limit value, the controller 110 may select, as eviction target data, all or some of the data stored in the second memory device 123. In another embodiment, when the residual capacity of the second memory device 123 reaches the limit value, the controller 110 may select, as the eviction target data, the oldest data among the data stored in the second memory device 123.

The controller 110 may control the second memory device 123 in step S109 to evict the eviction target data selected in step S107 to the storage device 125 in step S111, and to load the eviction target data into the first memory device 121 in step S113.

Therefore, the data removed from the second memory device 123 can be safely stored in the storage device 125, and loaded into the first memory device 121 so as to be read at high speed.

The evicted data may be removed from the second memory device 123 in step S115.

As the evicted data are loaded into the first memory device 121, the controller 110 may perform a management operation on the residual space of the first memory device 121 in step S117.

In response to a read request of the host device, the controller 110 may preferentially access the first memory device 121 or the second memory device 121 to read the requested data. In an embodiment, the controller 110 may initially access the second memory device 123 and try to read data at S121. When the requested data are not present in the second memory device 123, the controller 110 may access the first memory device 121 and try to read the requested data at step S122. When the requested data are not present in the first memory device 121, the controller 110 may access the storage device 125 to read the requested data at step S123.

FIG. 6 is a flowchart illustrating the operation of the data storage apparatus in accordance with the present embodiment, showing an operation of managing the first memory device.

At the initial stage, the first memory device 121 may be divided into the first area C1 and the second area C2 according to the preset initial value WM_DFT.

As data evicted from the second memory device 123 are stored in the second area C2, the controller 110 may check the residual capacity C2_R of the second area in step S201, and check whether the residual capacity C2_R of the second area has decreased to less than the first threshold value TH1, in step S203.

When the residual capacity C2_R of the second area is less than the first threshold value TH1 (Y in step S203), the controller 110 may check the residual capacity C1_R of the first area C1 in order to determine whether to incorporate at least a part of the residual capacity C1_R of the first area C1 into the second area C2 in step S205, and check whether the residual capacity C1_R of the first area is equal to or more than the second threshold value TH2 in step S207.

When the residual capacity C1_R of the first area C1 is equal to or more than the second threshold value TH2 (Y in step S207), the controller 110 may increase the capacity of the second area C2 by moving at least a part of the residual space C1_R of the first area C1 into the second area C2, in step S209. At this time, the capacity manager 207 may expand the second area C2 up to the maximum capacity WM_MAX.

The capacity of the first area C1, which can be incorporated into the second area C2 so as to satisfy the maximum capacity WM_MAX, may be determined at such a level that 20 to 30% of the first area C1 can be secured as the residual capacity of the first area C1.

On the other hand, when the residual capacity C2_R of the second area C2 is equal to or more than the first threshold value TH1 (N in step S203), the controller 110 may transition to a waiting state.

When the residual capacity C1_R of the first area C1 is less than the second threshold value TH2 (N in step S207), the controller 110 may remove and reset the data stored in the first memory device 121 in step S211.

Since write data of the host device are stored in the first and second memory devices 121 and 123 and then evicted to the storage device 125, the write data of the host device can be read from the second memory device 123 or the storage device 125, even though the data of the first memory device 121 are removed in step S211.

Figure 8:
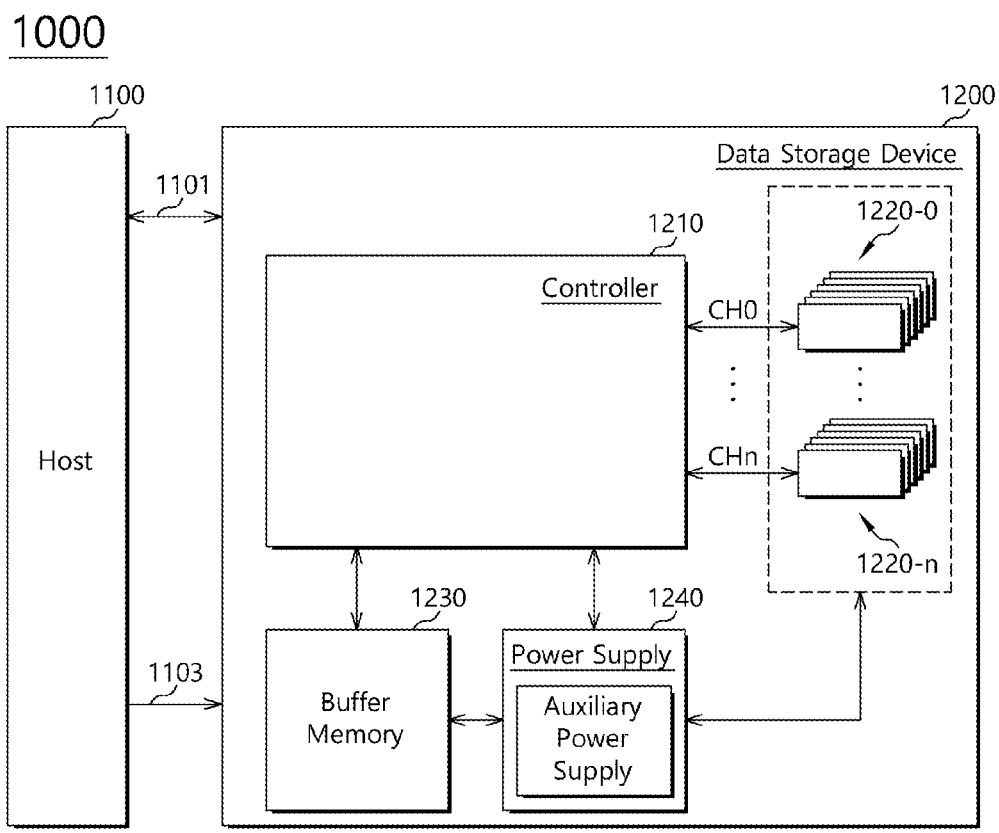
FIG. 8 illustrates a data storage system in accordance with an embodiment.

FIG. 8 is a diagram illustrating a data storage system 1000, in accordance with an embodiment.

Referring to FIG. 8, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may configured as controller 110 shown in FIGS. 1 and 2.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 9:
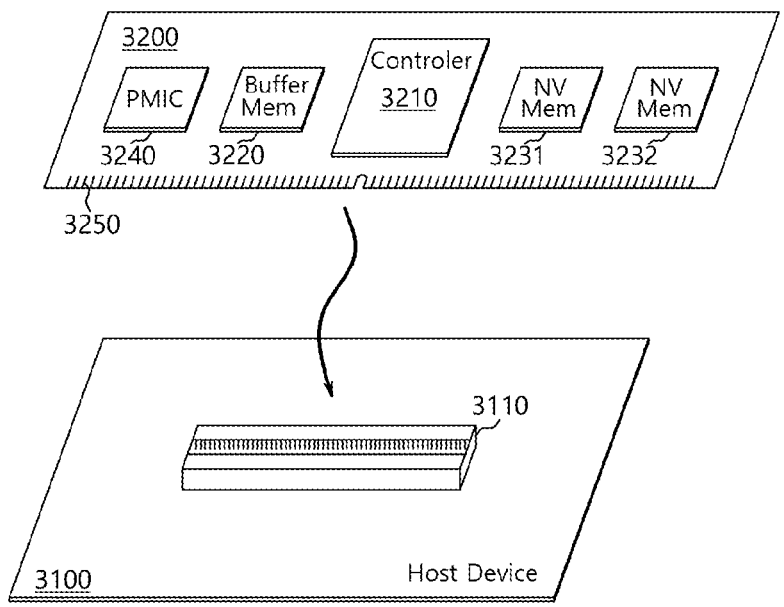
FIGS. 9 and 10 illustrate data processing systems in accordance with embodiments.

FIG. 9 is a diagram illustrating a data processing system 3000, in accordance with an embodiment. Referring to FIG. 9, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 10:
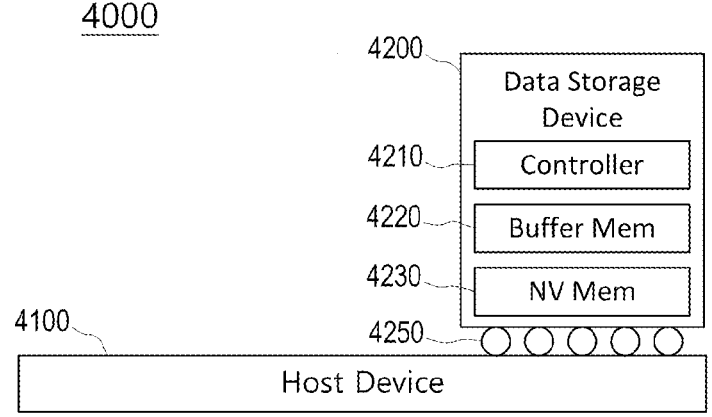

FIG. 10 is a diagram illustrating a data processing system 4000 in accordance with an embodiment. Referring to FIG. 10, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 11:
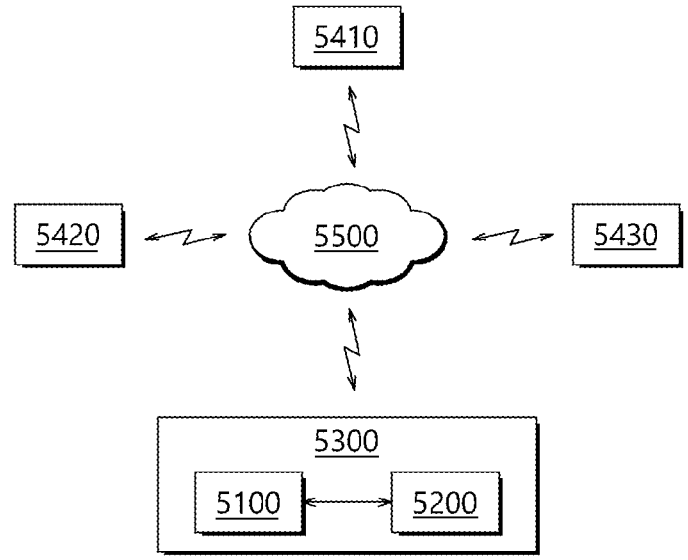
FIG. 11 illustrates a network system including a data storage device in accordance with an embodiment.

FIG. 11 is a diagram illustrating a network system 5000 including a data storage device, in accordance with an embodiment. Referring to FIG. 11, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 8, the memory system 3200 shown in FIG. 9, or the memory system 4200 shown in FIG. 10.

Figure 12:
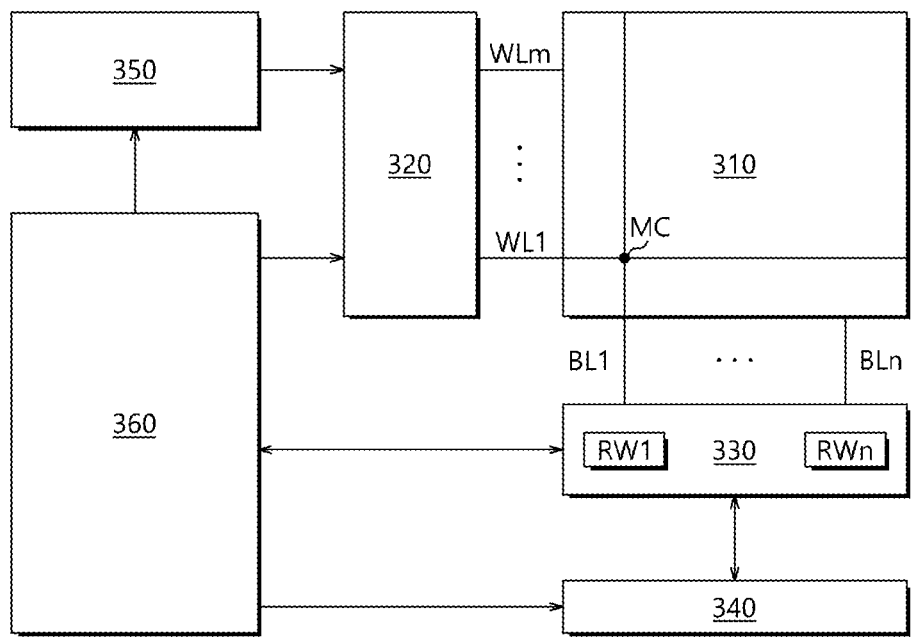
FIG. 12 illustrates a nonvolatile memory device included in a data storage device in accordance with an embodiment

FIG. 12 is a block diagram illustrating a nonvolatile memory device 300 included in a data storage device, such as the data storage device 10, in accordance with an embodiment. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure by perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While various embodiments have been described above, it will be understood to those skilled in the art that the embodiments described are examples only. Accordingly, the operating method of a data storage apparatus described herein should not be limited based on the described embodiments.

What is claimed is:

1. A data storage apparatus comprising:
    a first memory device divided into a first area in which write data from a host device are stored and a second area separate from the first area;
    a second memory device into which the write data stored in the first memory device are copied;
    a storage device; and
    a controller configured to control data input/output for the first memory device, the second memory device and the storage device,
    wherein the controller comprises a cache manager configured to:
        allocate capacities of the first and second areas according to preset initial values, and evict eviction target data from the second memory device by:
            storing the eviction target data into the storage device, and storing the eviction target data into the second area of the first memory device.

2. The data storage apparatus according to claim 1, wherein the first memory device operates at a first speed, the second memory device operates at a second speed lower than the first speed, and the storage device operates at a third speed lower than the first speed.

3. The data storage apparatus according to claim 1, wherein as the copy of the write data is stored in the second memory device, the cache manager selects the eviction target data to be evicted from the second memory device based on an eviction condition, wherein the eviction condition is based on a capacity of the second memory device, a storage time of data stored in the second memory device, an amount of data to be evicted, or combinations thereof.

4. The data storage apparatus according to claim 1, wherein when a residual capacity of the second area is less than a first threshold value and a residual capacity of the first area is equal to or more than a second threshold value as the data evicted from the second memory device are stored in the first memory device, the cache manager incorporates at least a part of the residual capacity of the first area into the second area.

5. The data storage apparatus according to claim 1, wherein in response to a read request of the host device, the controller reads data by initially accessing the second memory device, accessing the second area of the first memory device when the requested data is not found in the second memory device, and accessing the storage device when the requested data is not found in the second area of the first memory device.

6. A data storage apparatus comprising:
    a first memory device configured to operate at a first speed;
    a second memory device configured to operate at a second speed lower than the first speed;
    a storage device; and
    a controller configured to select eviction target data from the second memory device and evict the eviction target data to the first memory device and the storage device,
    wherein the first memory device is divided into a first area in which write data from a host device are stored and a second area separated from the first area and in which data evicted from the second memory device are written, and
    the controller is further configured to allocate capacities of the first and second areas according to preset initial values.

7. The data storage apparatus according to claim 6, wherein the controller stores a copy of the write data for the first memory device in the second memory device.

8. The data storage apparatus according to claim 6, wherein the storage device operates at a third speed lower than the first speed.

9. The data storage apparatus according to claim 6, wherein as a copy of the write data is stored in the second memory device, the controller selects the eviction target data to be evicted from the second memory device based on an eviction condition.

10. The data storage apparatus according to claim 6, wherein when a residual capacity of the second area is less than a first threshold value and a residual capacity of the first area is equal to or more than a second threshold value, the controller incorporates at least a part of the residual capacity of the first area into the second area.

11. An operation method of a data storage apparatus which includes a first memory device, a second memory device, a storage device, and a controller, the operation method comprising:
   storing, by the controller, write data of a host device into the first memory device, and copying the write data into the second memory device;
   evicting, by the controller, eviction target data from the second memory device by storing the eviction target data into the storage device and into the first memory device, and
   allocating, by the controller, capacities of first and second areas of the first memory device according to preset initial values,
   wherein the first memory device is divided into the first area in which write data from a host device are stored and the second area separated from the first area and in which data evicted from the second memory device are written.

12. The operation method according to claim 11, wherein the first memory device operates at a first speed, the second memory device operates at a second speed lower than the first speed, and the storage device operates at a third speed lower than the first speed.

13. The operation method according to claim 11, further comprising selecting, by the controller, the eviction target data to be evicted from the second memory device based on an eviction condition when the copy of the write data is stored in the second memory device.

14. The operation method according to claim 11, further comprising:
   incorporating, by the controller, at least a part of a residual capacity of the first area into the second area when a residual capacity of the second area is less than a first threshold value and the residual capacity of the first area is equal to or more than a second threshold value when the data evicted from the second memory device are stored in the second area of the first memory device.

15. The operation method according to claim 14, further comprising removing and resetting, by the controller, the data stored in the first memory device when the residual capacity of the second area is less than a first threshold value and the residual capacity of the first area is less than a second threshold value.

16. The operation method according to claim 11, further comprising reading, by the controller in response to a read request of the host device, data by initially accessing the second memory device, accessing the second area of the first memory device after accessing the second memory device, and accessing the storage device after accessing the second area of the first memory device.

* * * * *